July 28, 1942.  H. F. VICKERS  2,291,011
SPEED GOVERNOR
Filed Nov. 17, 1937  3 Sheets-Sheet 1
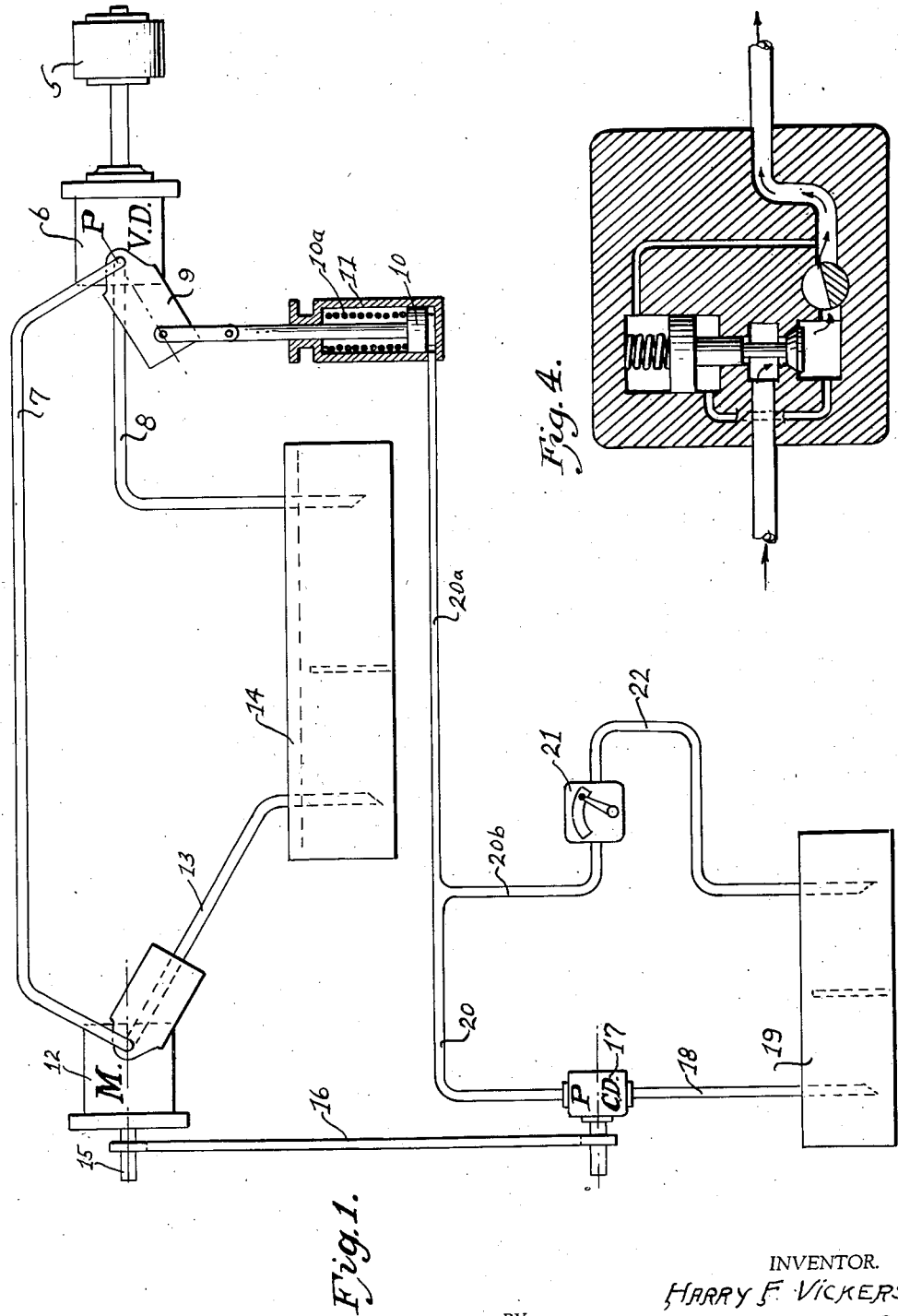
INVENTOR.
HARRY F. VICKERS
BY
Barnes, Kisselle, Laughlin & Raisch
ATTORNEY.

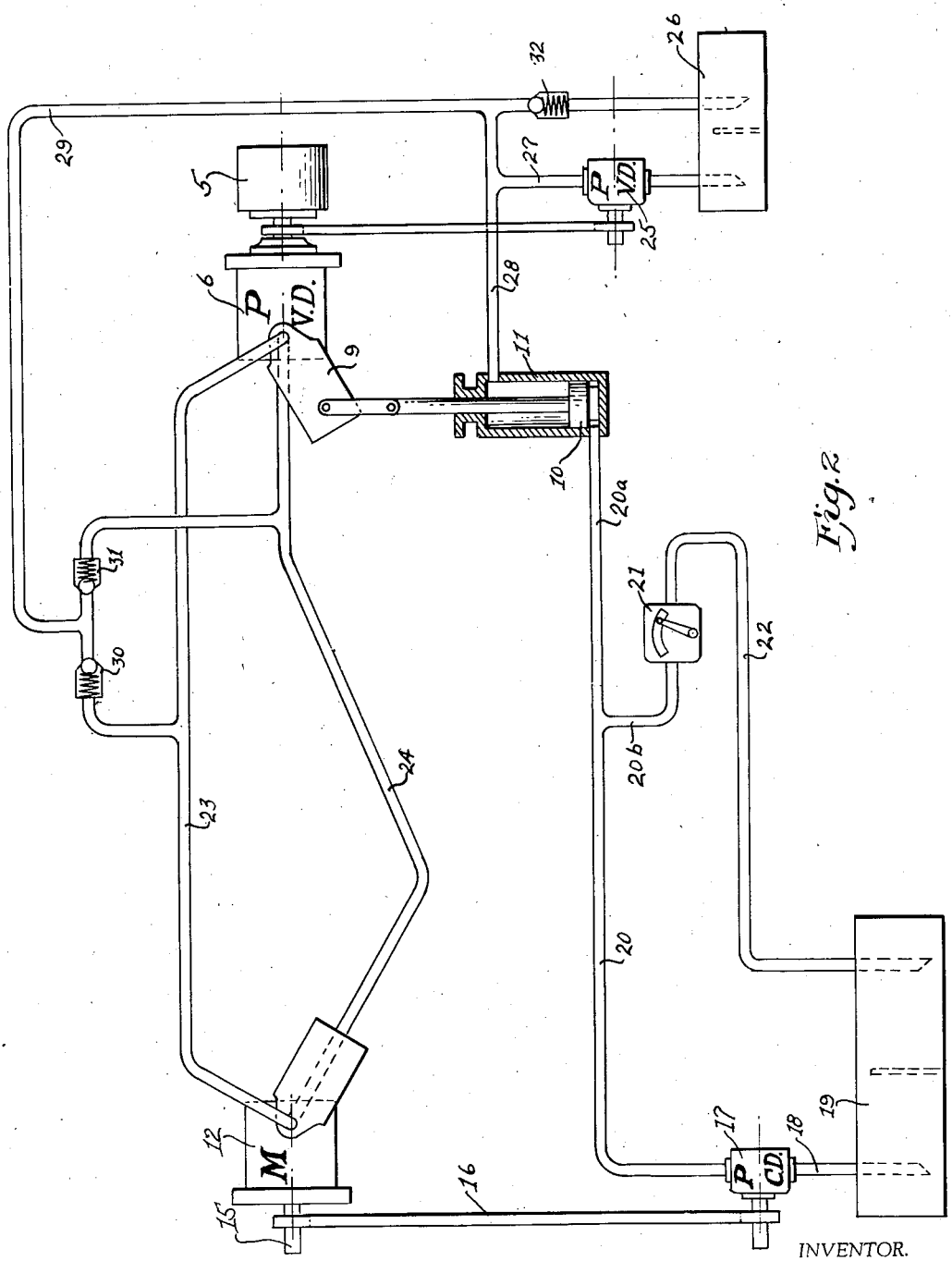

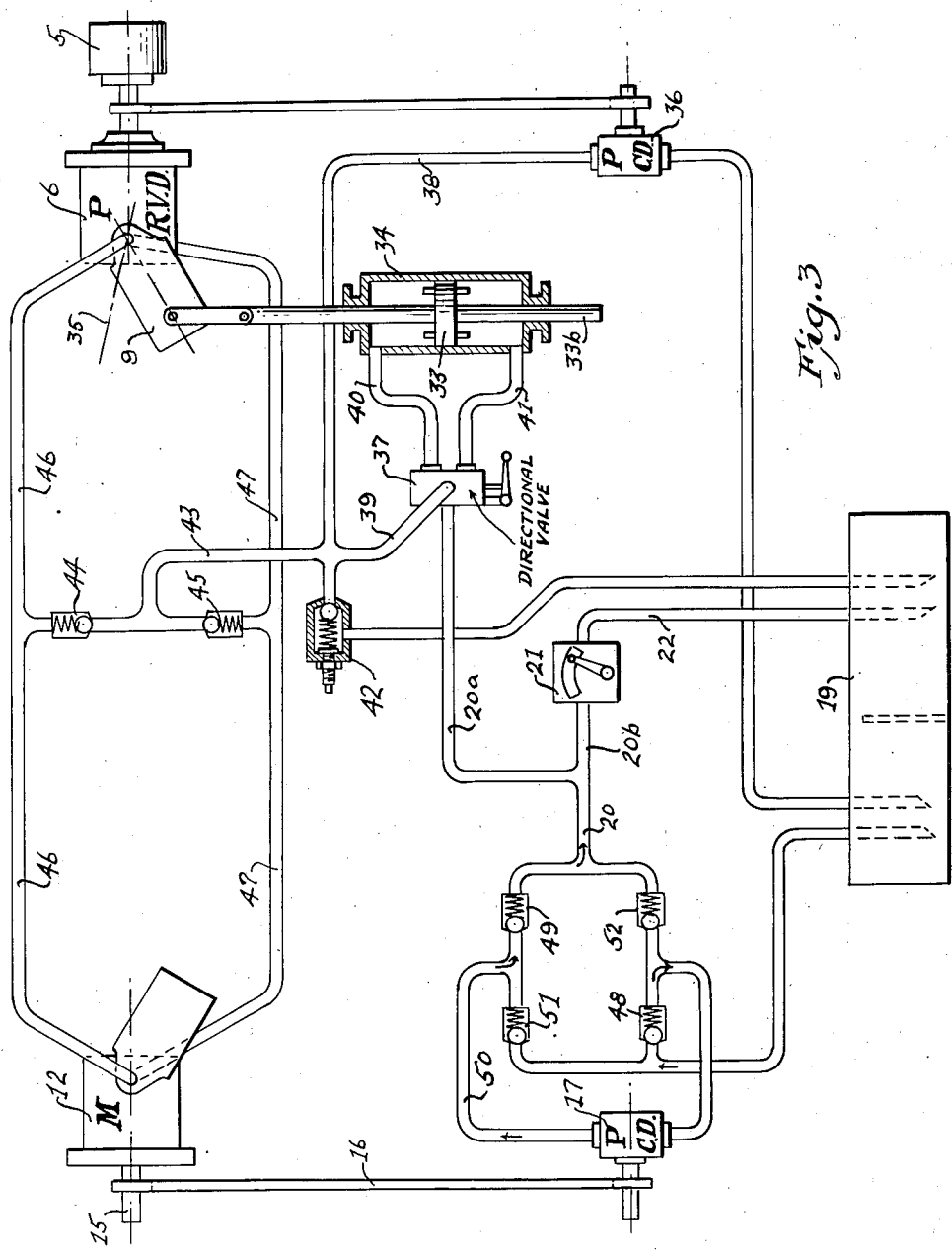

Patented July 28, 1942

2,291,011

UNITED STATES PATENT OFFICE 2,291,011

SPEED GOVERNOR

Harry F. Vickers, Detroit, Mich., assignor to Vickers Incorporated, Detroit, Mich., a corporation of Michigan Application November 17, 1937, Serial No. 175,075

9 Claims. (Cl. 60—53)

This invention relates to a hydraulic speed governor apparatus and more particularly to that type of transmission in which a constant speed is required on an output shaft.

The object of the present invention is to provide a speed control apparatus for fluid motors which have variable speed adjustments, said control being adapted to accurately control the speed of the output shaft regardless of the load on the shaft.

In an ordinary transmission of the type, for example, wherein a variable displacement pump furnishes liquid to a fixed displacement motor, the speed of the motor will be reduced when a heavy load is applied because of the inherent leakage or slip of both the pump and the motor. Furthermore, in many of these drives the speed of the pump input drive source is sometimes subject to variation and this influences the speed of the output motor.

The present invention contemplates an apparatus which provides automatic compensation for speed changes in fluid motors; and, in the above example, the control compensates for both pump and motor slippage due to load changes, and for variations in the speed of the pump input power source.

In the drawings:

Figs. 1 and 2 illustrate the apparatus for controlling a non-reversible system in which a variable displacement pump and a fixed displacement motor are used.

Fig. 3 illustrates a constant speed apparatus which is reversible.

Fig. 4 illustrates a metering valve used with the systems described herein.

Referring to the modification of Fig. 1, a power input unit 5 is connected to a variable piston displacement pump 6. This pump 6 is provided with a pressure conduit 7, a suction tank conduit 8, and with a movable swivel head 9 which is connected by linkage to a piston 10 located in a plunger cylinder 11 and having a spring 10a acting thereon. The pressure conduit 7 leads to a fixed displacement fluid motor 12 which has a return conduit 13 leading to a tank 14 from which the conduit 8 originates. An output shaft 15 of the motor 12 is connected by a belt 16 to the input shaft of a pump or rotary metering device 17 of the constant displacement per revolution type. This pump 17 has a tank conduit 18 leading from a tank 19 and also a pressure conduit 20 which has a branch 20a leading to the lower surface of the piston 10 in the cylinder 11, and a branch 20b leading to an adjustable flow control or metering valve 21 which empties into the tank 19 through a conduit 22. This metering valve 21 can consist of an adjustable orifice and preferably is a hydrostatically compensated flow regulator valve of the type fully disclosed in British Patent No. 399,609, dated October 12, 1933. This valve is shown in detail in Fig. 4.

In the operation: The piston 10 is normally urged by the spring 10a to the lower end of the cylinder 11 as shown in Fig. 1. This places the variable displacement pump 6 in a maximum volume position. Assuming that the flow control valve 21 is set to pass 100 cubic inches per minute and assuming that the displacement of the pump 17 is 1 cubic inch per revolution, the pump 17 will have to rotate 100 R. P. M. to deliver a volume sufficient to supply the flow through valve 21. Once the system is started a constant pressure will be established in line 20a (neglecting, of course, the effect of increased spring force on compression). The piston 10 serves much as an accumulator so far as line 20a is concerned. That is, an addition of oil to line 20a will cause piston 10 to yield upwardly and any oil out of line 20a will cause piston 10 to follow up and maintain the pressure in line 20a. If a load is applied to the motor 12 so that the motor 12 and pump 17 are running at a lesser speed than 100 R. P. M., the volume output of pump 17 will be less than the setting of valve 21. The piston 10, by reason of the spring 10a, will then move to push oil from line 20a into line 20b to make up the deficiency. The result is an increase in displacement of pump 6 and an increase in speed of motor 12 until the pump 17 supplies a volume equivalent to the setting of the valve 21 at which time the movement of the piston 10 will stop.

In case the change in the system is not an increase of load on the motor 12 but a decrease of the speed of the power input unit 5, much the same action will take place. The volume of liquid being delivered by the pump 6 will decrease and as a result the speeds of the motor 12 and the pump 17 will also decrease. With this decrease of speed, as above described, the piston 10 will then lower to increase the volume displacement of the pump 6 and thereby raise the pump delivery to a point where the speed of the motor 12 will again be as desired.

Due to reductions in load on the motor 12 or increases in speed in the power input unit 5, it is possible that the motor 12 and the pump 17 will revolve at a speed greater than 100 R. P. M.

Under these circumstances the volume supplied by the pump 17 will exceed that which can flow through valve 21. Consequently fluid will flow through the conduit 20a to the cylinder 11 to overcome the spring in the cylinder and raise the piston 10 to a point where the output of the pump 6 is reduced to secure the necessary reduction in pump output and motor speed.

The speed governor shown in Fig. 2 acts on the same principle as that shown in Fig. 1. In this modification the spring in the cylinder 11 is replaced by a low pressure oil supply. The delivery of the pump 6 is conducted to the pressure inlet of the motor 12 through a conduit 23 and the exhaust outlet of the motor 12 is connected to the inlet of the pump 6 through a conduit 24. A low pressure pump 25 is driven by the power input 5 and draws liquid from a tank 26. The outlet of the pump 25 is connected through conduits 27 and 28 with the top portion of the cylinder 11. The pump 25 is also connected with conduits 23 and 24 by conduit 29 and check valves 30 and 31 respectively. A relief valve 32 controls the output pressure of the pump 25.

This modification in Fig. 2 is used especially where it is desirable to form a closed circuit between the pump 6 and the motor 12. In the operation of this modification the pump 25 will furnish leakage replacement liquid through conduit 29 and one of the check valves 30 or 31, depending on which of the conduits 23, 24 happens to be lower in pressure. Because of valve 32, the pump 25 will also maintain a substantially constant pressure on the top of the piston 10 and in this manner act as does the spring in the cylinder 11 of Fig. 1. It is believed unnecessary to go into additional detail with regard to the operation of this circuit since, other than above indicated, it is essentially the same as that of Fig. 1.

A third modification of the invention is illustrated in Fig. 3 where the power input 5, the pumps 6 and 17, the motor 12, and the flow control valve 21 are the same as those described with reference to Figs. 1 and 2. The arrangement of Fig. 3 is a reversible type of speed governor. The swivel head 9 of the pump 6 is connected by linkage to a piston 33 which is mounted in a housing 34. In addition to the usual piston rod, the piston 33 is also provided with a balancing and guiding rod 33b. This piston has sufficient movement in this housing that it may be shifted upward to allow the swivel head to operate above the centerline of the pump housing 6 as indicated by the centerline 35. This permits the pump 6 to reverse in direction. An auxiliary low pressure pump 36 operates from the shaft between the power unit 5 and the pump 6 and furnishes pressure to one end or the other of cylinder 34 depending on the position of a four-way valve 37. Conduits 38, 39, 40 and 41 connect the outlet of the pump 36 with the four-way valve 37 and the cylinder 34. A relief valve 42 determines the pressure of the liquid delivered from the pump 36. A conduit 43 and check valves 44 and 45 allow the pump 36 to replace leakage from the pressure-return lines 46 and 47 which are located between the pump unit 6 and the motor 12.

The motor 12 is, of course, reversible, its direction depending on whether the pressure from pump 6 comes from the line 46 or the line 47. A control pump 17 is also reversible and is adapted to furnish pressure liquid through the lines 20 and 20a to the four-way valve 37 where it will be directed to one end of the cylinder 34, the other end of the cylinder being open through the valve 37 to the pump 36. Line 20 is also open to the tank through the line 20b and the usual flow control valve 21. A compound check valve and conduit system is provided for the control pump 17 to permit it to be reversible. When the pump 17 is running in one direction a check valve 48 will admit liquid from tank 19 to the inlet of the pump 17 and a check valve 49 will admit pressure from an outlet conduit 50 to the line 20. If the direction of the pump 17 is reversed a check valve 51 will admit supply liquid from the tank 19 to the now inlet conduit 50 and a check valve 52 will admit pressure from the outlet of the pump 17 to the line 20.

In the operation of the apparatus shown in Fig. 3, assuming that the four-way valve 37 is in the position shown, liquid from the low pressure pump 36 will be admitted to the top of the cylinder 34 through the conduits 38, 39 and 40. The delivery from the control pump 17 flows through the conduit 50 and the check valve 49 to the conduit 20 where it branches off into the conduit 20b and through the flow control valve 21. The delivery from the pump 17 also passes through the conduit 20a, the four-way valve 37 and the conduit 41 to the lower portion of the cylinder 34. The operation from here on is the same as described in connection with Fig. 1. Increases or decreases in the speed of the shaft 15 of the motor 12 are compensated for by changes in the position of the piston in cylinder 34 and of the swivel head 9 of the pump 6.

The shifting of the four-way valve 37 will reverse the entire system by admitting low pressure from the pump 36 to the lower portion of the cylinder 34 and by admitting the control pressure from the conduit 20a to the top portion of the cylinder 34. Under these circumstances the swivel head 9 will shift upwardly so that its centerline substantially coincides with the centerline 35 and the pressure flow through the pump 6 and the motor 12 will consequently be reversed.

The apparatus disclosed in Figs. 1, 2, and 3 is especially useful for vehicles on which a constant speed motor is desired for refrigerating or water pumping or other purposes. The power unit 5 may be connected to the axle or other revolving part of the vehicle and under normal circumstances a constant speed may be maintained in the shaft 15 regardless of the speed of the vehicle.

What I claim is:

1. In a hydraulic speed governor, a fixed displacement motor to be driven at a constant speed, a rotatable output shaft on said motor, a variable delivery pump hydraulically connected with said motor and adapted to be driven at varying speeds, a movable part on said pump for controlling the delivery of pressure fluid to said motor, a control pump driven by said output shaft, a metering valve connected to a pressure outlet of said control pump and having a constant volumetric discharge rate, a hydraulic actuator means hydraulically connected to said control pump outlet and operably connected with said movable part whereby the output of said control pump tends to shift said movable part to decrease the stroke of said variable delivery pump, and means urging said movable part towards maximum volume position, whereby a substantially constant speed may be maintained at said motor independent of changes in speed of said variable delivery pump.

2. In a hydraulic speed governor, a fixed displacement motor to be driven at a constant speed, a rotatable output shaft on said motor, a variable delivery pump hydraulically connected with said motor and adapted to be driven at varying speeds, a movable part on said pump for controlling the delivery of pressure fluid to said motor, a control pump driven by said output shaft, a metering valve connected to a pressure outlet of said control pump and having a constant volumetric discharge rate, and a hydraulic actuator means comprising a cylinder, a piston in said cylinder having an operable connection with said movable part, spring means urging said movable part means towards a maximum volume position, and hydraulic connections between said control pump and said cylinder whereby the output from said control pump tends to shift said piston and movable part to decrease the stroke of the variable delivery pump, whereby a substantially constant speed may be maintained at said motor irrespective of the speed of said variable delivery pump.

3. In a hydraulic speed governor, a fluid operated power unit, a rotatable output shaft thereon, a variable delivery pump adapted to furnish fluid under pressure to said power unit, a movable part on said pump for controlling the delivery volume of said pump, a control pump driven from said output shaft, a metering valve having a constant volumetric discharge rate connected to the outlet of said control pump and arranged to receive and discharge the output of said control pump, a means comprising a cylinder, a piston in said cylinder having an operable connection with said movable part, and hydraulic connections between the outlet of said control pump and one end of said cylinder whereby variations in discharge of said control pump cause actuation of said piston to regulate the position of said movable part and thus vary the volume output of the variable delivery pump inversely to the change in volume output of the control pump and thereby maintain the speed of the output shaft constant, and an auxiliary pump connected to the other end of said cylinder to urge said piston and movable part towards maximum volume position.

4. In a hydraulic speed governor, a fluid operated power unit, a rotatable output shaft thereon, a variable delivery pump, adapted to furnish fluid under pressure to said power unit, a movable part on said pump for controlling the delivery volume of said pump, a control pump driven from said output shaft, a metering valve having a constant volumetric discharge rate connected to the outlet of said control pump and arranged to receive and discharge the output of said control pump, a pressure responsive means comprising a cylinder, a piston in said cylinder having an operable connection with said movable part, an auxiliary pump connected to and supplying fluid under constant pressure to one end of said cylinder to urge said piston and movable part towards maximum volume position, and hydraulic connections between the outlet of said control pump and the other end of said cylinder whereby variations in discharge of said control pump cause actuation of said piston to regulate the position of said movable part and thus vary the volume output of the variable delivery pump inversely to the change in volume output of the control pump and thereby maintain the speed of the output shaft constant, and hydraulic connections between said auxiliary pump and connecting conduits of said power unit and said variable delivery pump whereby replacement liquid is furnished to said conduits.

5. In a hydraulic speed governor, a reversible fluid operated power unit, a rotatable output shaft thereon, a reversible variable delivery pump adapted to furnish fluid under pressure to said power unit, a movable part on said pump for controlling the direction and volume of delivery therefrom, interchangeable pressure-exhaust conduits between the variable delivery pump and said power unit, a reversible control pump driven from said output shaft, an auxiliary pump delivering fluid under constant pressure, a four-way valve connected to the outlet conduits of said control pump and said auxiliary pump, pressure responsive means comprising a cylinder having each end connected to said four-way valve whereby pressure fluid from said control pump and said auxiliary pump may be interchangeably exerted on the respective ends of said cylinder, and a piston in said cylinder operably connected to said movable part, and a metering valve having a constant volumetric discharge rate connected to receive and discharge the output of said control pump whereby variations in discharge of said control pump cause actuation of said piston to vary the volume output of the variable delivery pump inversely to the change in volume output of the control pump and thereby maintain the speed of the output shaft constant.

6. In a hydraulic speed governor, a reversible fluid operated power unit, a rotatable output shaft thereon, a reversible variable delivery pump adapted to furnish fluid under pressure to said power unit, a movable part on said pump for controlling the direction and volume of delivery therefrom, interchangeable pressure-exhaust conduits between the variable delivery pump and said power unit, a reversible control pump driven from said output shaft, an auxiliary pump delivering fluid under constant pressure, pressure responsive means hydraulically connected to said auxiliary and control pumps, means for interchangeable directing the pressure fluid from said auxiliary and control pumps to opposite sides of said pressure responsive means, and a metering valve having a constant volumetric discharge rate arranged to receive and discharge the output of said control pump whereby variations in discharge of said control pump cause actuation of said pressure responsive means to vary the volume output of the variable delivery pump inversely to the change in volume output of the control pump and thereby maintain the speed of the output shaft constant.

7. In a hydraulic speed governor, a fluid operated power unit, a rotatable output shaft thereon, a variable delivery pump adapted to furnish fluid under pressure to said power unit, a movable part on said pump for controlling the delivery volume of said pump, a control pump driven from said output shaft, a metering valve having a constant volumetric discharge rate connected to the outlet of said control pump and arranged to receive and discharge the output of said control pump, a means comprising a cylinder, a piston in said cylinder having an operable connection with said movable part, means urging said movable part towards maximum volume position, and hydraulic connections between the outlet of said control pump and one end of said cylinder whereby variations in discharge of said control pump cause actuation of said piston to regulate the position of said movable part and thus vary the volume output of the variable delivery pump inversely to the change in volume output of the control pump and thereby maintain the speed of the output shaft constant.

8. In a hydraulic speed governor, a fixed displacement motor to be driven at a constant speed, a rotatable output shaft on said motor, a variable delivery pump hydraulically connected with said motor and adapted to be driven at varying speeds, a movable part on said pump for controlling the delivery of pressure fluid to said motor, a control pump driven by said output shaft, an adjustable metering valve connected to a pressure outlet of said control pump and having a constant volumetric discharge rate at any given adjustment, a hydraulic actuator means hydraulically connected to said control pump outlet and operably connected with said movable part whereby the output of said control pump tends to shift said movable part to decrease the stroke of said variable delivery pump, and means urging said movable part towards maximum volume position, whereby a substantially constant speed may be maintained at said motor for a given adjustment of the metering valve independent of changes in speed of said variable delivery pump.

9. In a variable speed power hydraulic transmission system for driving a load device at a controlled speed, a variable speed transmission including a pump unit and a motor unit connected to a load device, a pressure responsive movable part on one of said units for varying the output speed of the transmission, a control pump driven by the transmission, a metering valve connected to a pressure outlet of said control pump and having a constant volumetric discharge rate, a hydraulic actuator means hydraulically connected to said control pump outlet and operably connected with said movable part whereby the output of said control pump normally tends to shift said movable part to decrease the speed of the transmission, and means urging said movable part towards maximum speed position whereby any changes in the output speed of the transmission are reflected in the output of the control pump and a substantially constant speed may be maintained at the output of said transmission.

HARRY F. VICKERS.